United States Patent

Glithro

[15] 3,641,925
[45] Feb. 15, 1972

[54] FRYING RANGES
[72] Inventor: Phillip Glithro, Huddersfield, England
[73] Assignee: E. W. Proctor Limited, Huddersfield, England
[22] Filed: Mar. 25, 1969
[21] Appl. No.: 810,130

[30] Foreign Application Priority Data

Mar. 29, 1968    Great Britain.....................15,098/68

[52] U.S. Cl....................................99/416, 99/339, 220/38, 312/284, 312/328
[51] Int. Cl. ..........................................A47j 37/12
[58] Field of Search ..................99/403, 339, 416; 312/284, 312/290, 325, 326, 328; 49/249, 250, 252; 126/37; 220/37, 38

[56] References Cited

UNITED STATES PATENTS

| 2,966,999 | 1/1961 | Swanson | 220/38 X |
| 346,896 | 8/1886 | Cooper | 312/328 X |
| 2,301,856 | 11/1942 | Conwell | 312/328 X |
| 2,840,436 | 6/1958 | Mason | 312/284 |
| 3,113,338 | 12/1963 | Westlund | 49/250 X |

FOREIGN PATENTS OR APPLICATIONS

| 166,975 | 10/1950 | Austria | 220/37 |

Primary Examiner—Billy J. Wilhite
Attorney—Norris & Bateman

[57] ABSTRACT

A frying range comprises a pan having a closure lid mounted above the pan by articulation means including guides fixed on the pan and studs projecting from lid into the guides and a cranked lever pivoted at one end on the pan and at its other end on the lid, the articulation means constraining a rear part of the lid to move rearwardly along a substantially horizontal path and a front part of said lid to move along an arcuate path to produce a compound translational and tilting motion of the lid between a closed position overlying the pan and a spaced fully open position.

18 Claims, 2 Drawing Figures

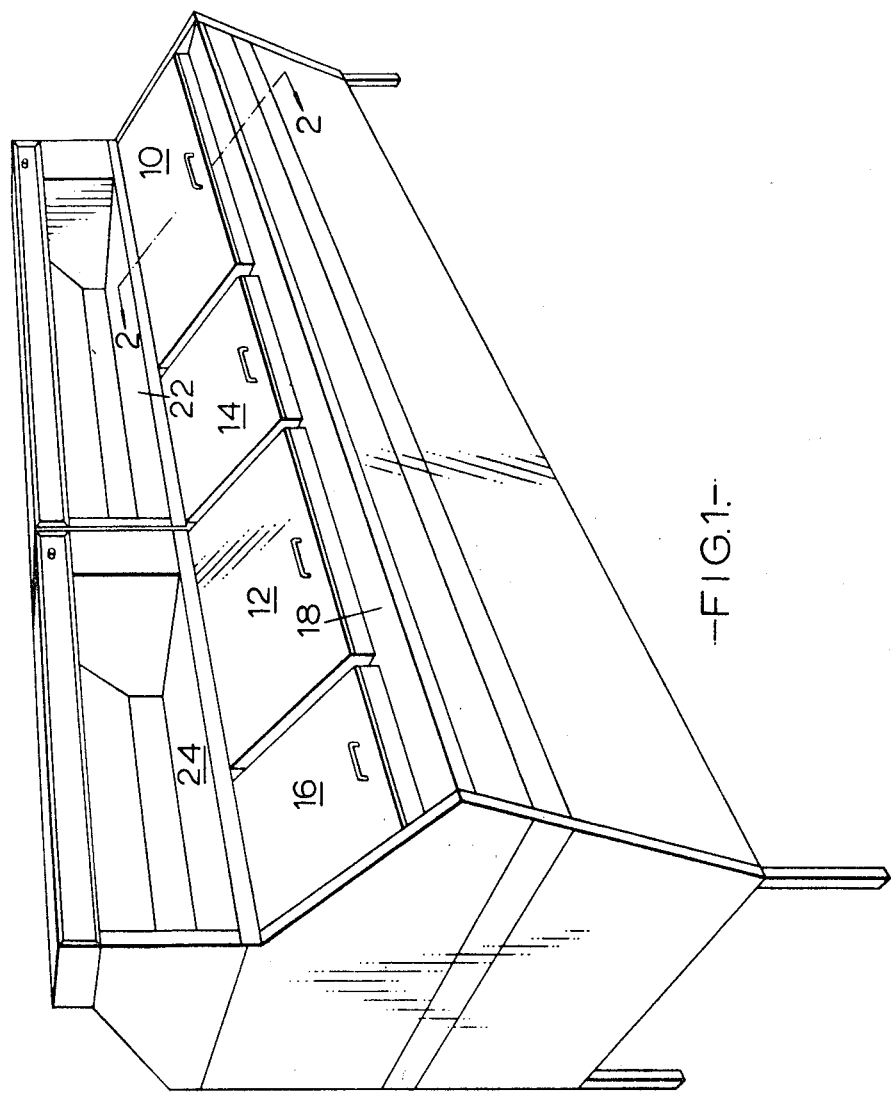

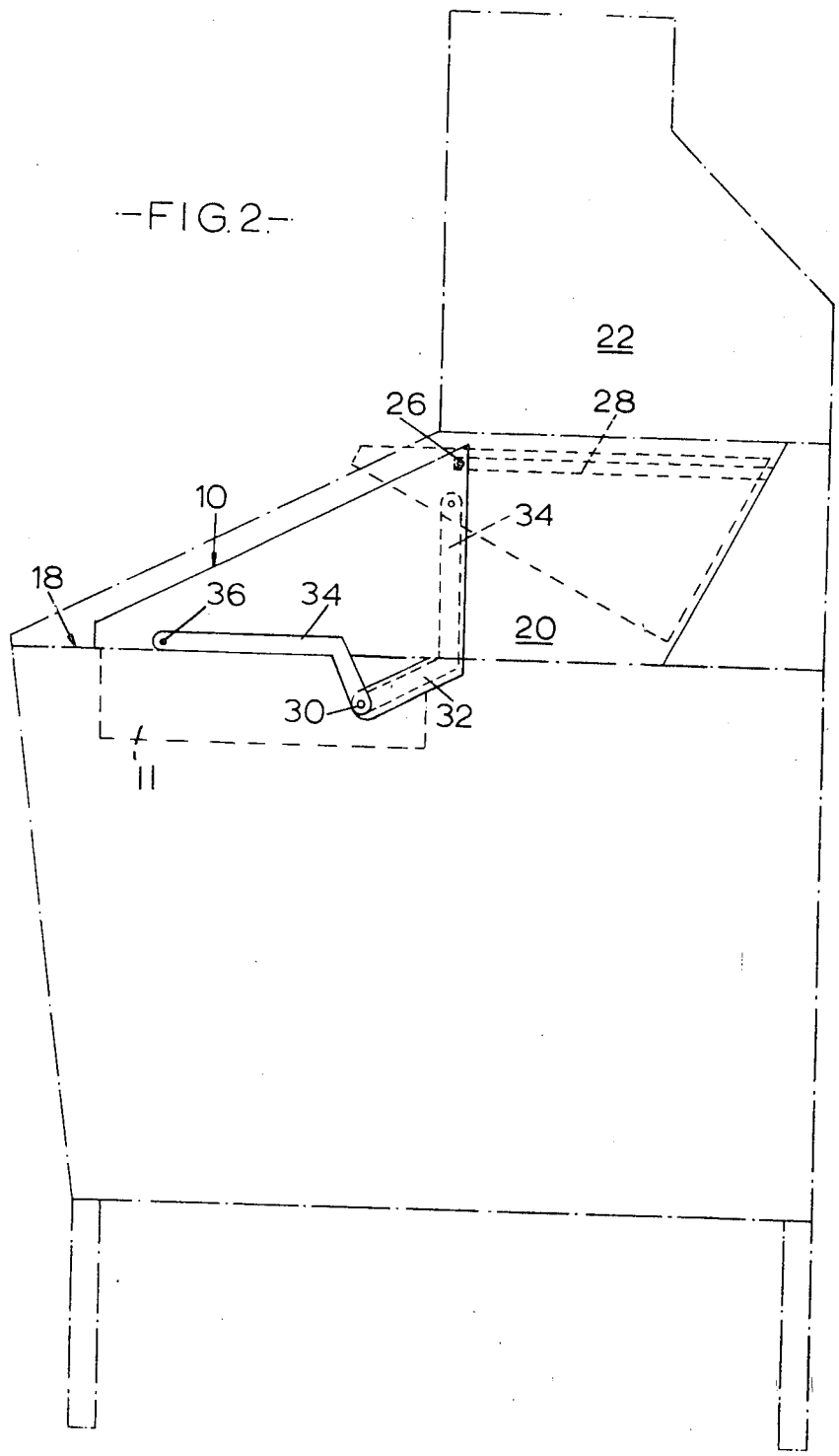

FRYING RANGES

This invention relates to frying ranges of the kind used by fish fryers and has for its object to provide an improvement therein.

According to the invention a frying range of the kind used by fish fryers comprises a pan with a lid mounted in such a way that it can be retracted rearwardly to give access to the pan, the lid being articulated so that when moving rearwardly into the open position, its rear end follows a substantially horizontal path, but its front end follows an arcuate path.

The invention therefore requires the provision of articulation means for the rear and front parts of the lid and that for the rear part may comprise a stud projecting from a sidewall of the lid and engaging on a guide member which is adapted to constrain the stud to follow a substantially horizontal path as the lid moves rearwardly. The articulation means for the front part of the lid may comprise a link pivoted at one end on a pivot pin fixed relatively to the pan and at its other end on a pin fixed to the front part of the lid.

It is preferred however to provide a stud projecting from the rear part of each side of the lid and engaging respectively in a pair of channel guide members fixed relatively to the pan, and similarly it is preferred to provide two links, one at each side of the lid. Moreover, the links are preferably connected to pivot pins which project inwards from the sidewalls of the lid so that the links pass inside the lid and are concealed when the lid is open.

A frying range may, of course, incorporate a plurality of pans arranged side-by-side.

In order that the invention may be fully understood and readily carried into effect, a preferred embodiment thereof will now be described by way of example only, with reference to the drawings wherein:

FIG. 1 is a perspective view of a frying range embodying the invention, and

FIG. 2 is a part-sectional view on the line 2—2 in FIG. 1.

Referring now to FIG. 1 of the drawings, a frying range of the kind used by fish friers is provided with two frying pans one of which is indicated at 11 and two other pans (not shown) one of which will be used as a chip pan and the other of which will be used as a utensil box, the two frying pans and the two other pans being arranged alternately and being provided with respective lids 10, 12, 14 and 16. A flat horizontal (or substantially horizontal) surface 18 at the front of the range is continuous with horizontal surfaces between the pans and in the closed positions of the lids, the latter rest upon these horizontal surfaces that is to say, the front edges of the lids rest upon the surface 18 and the side edges of the lids rest upon the surfaces between the pans.

The lids can be retracted into respective spaces 20 beneath a pair of food warmers 22 and 24 which overlie the rear of the pans, and the manner in which the lids are mounted is illustrated in FIG. 2. Each lid is provided, adjacent its rearmost upper edge, with a pair of aligned studs 26 which project laterally outwards from the lid and engage respectively in horizontal channels 28 extending rearwardly along surfaces which define the width of the spaces 20. The rear ends of the lids are thus constrained to move along horizontal paths. The front ends of the lids on the other hand are constrained to move in arcs about the axes of aligned pivot pins 30 which are carried by brackets 32, respective links 34 being pivotally connected to the pivot pins and to similar pivot pins 36 which project inwards from sidewalls of the lids. The links 34 pass inside the lids and consequently, when the lids are closed, the links are hidden from view within them. When the lids are raised, to the position shown in chain-dotted lines in FIG. 2, the spaces immediately above the pans are not interrupted by the usual and rather unsightly upstanding walls having arcuate guides for lids. On the contrary, there is an entirely open appearance about the range which makes the pans more than usually accessible. The links 34 are cranked as shown in FIG. 2 so that this open appearance is not marred by the links when the lids are opened, but assume the position shown in chain-dotted lines.

It will, of course, be understood that the range may have any required number of pans, including a simple case of a single pan, and that other necessary fitments, such as its heating arrangement and its flue design, may be entirely conventional.

What is claimed is:

1. A frying range of the kind used for frying fish and the like comprising a pan, a lid for closing said pan and articulation means mounting said lid for movement between a closed position overlying said pan to a fully open position in a space rearwardly and above said pan comprising means effective during movement of the lid between said closed and open positions for constraining a front part of said lid to move in an arcuate path while constraining a rear part of said lid to move along a substantially horizontal path whereby said lid has a compound translational and tilting motion away from said pan between said closed and open positions, wherein said means constraining the rear part of said lid to move along a substantially horizontal path includes guide means fixed relatively to said pan and stud means projecting from said lid and engaging said guide means.

2. A frying range according to claim 1, wherein said guide means comprises a channel member and said stud means engages in said channel member.

3. A frying range according to claim 2, wherein said articulation means includes a pair of said channel members fixed relatively to said pan and disposed one on each side of said lid, and a pair of said studs projecting one from each side of said lid and engaging respectively in said channel members.

4. A frying range of the kind used by fish friers comprising a pan, a lid for closing said pan, and articulation means including a link pivoted at one end on a pivot fixed relatively to said pan and pivoted at its other end to said lid mounting said lid for movement between a closed position overlying said pan and a spaced, fully open position, said means constraining a rear part of said lid to move rearwardly along a substantially horizontal path and a front part of said lid to move along an arcuate path, whereby said lid has a compound translational and tilting motion between said closed and said fully open positions.

5. A frying range according to claim 4, wherein said articulation means comprises a pair of said links disposed one on each side of said lid.

6. A frying range according to claim 1, wherein said constraining the rear portion of said lid to move along a substantially horizontal path means comprises a pair of channel members fixed relatively to said pan and disposed one on each side of said lid and a pair of studs projecting one from each side of said lid and engaging respectively in said channel members.

7. A frying range according to claim 4, wherein the pivot at said other end of said lid comprises a pivot pin that projects inwardly from a sidewall of said lid and said link passes inside said lid and engages on said pivot pin.

8. A frying range according to claim 7, wherein a pair of said pivot pins project inwardly one from each of the sidewalls of said lid and said links both pass inside said lid and engage respectively one on each of said pivot pins.

9. A frying range according to claim 8 wherein each of said links is cranked so that a part of each said link intermediate its ends is offset rearwardly from a straight line joining its pivot mountings.

10. A frying range according to claim 4, wherein said link is cranked so that a part of said link intermediate its ends is offset rearwardly from a straight line joining its pivot mountings.

11. A frying range of the kind used by fish friers comprising a pan, a lid for closing said pan, and articulation means mounting said lid for movement between a closed position overlying said pan and a spaced fully open position, said articulation means including guide means fixed relatively to said pan and stud means projecting from said lid and engaging on said guide means, a cranked lever pivotably mounted by one end on a pivot fixed relatively to said pan and pivoted at its other end to said lid, whereby said articulation means constrains a rear part of said lid to move rearwardly along a substantially horizontal path and a front part of said lid to move along an arcuate path to produce a compound translational and tilting motion of said lid between said closed and said fully open positions.

12. A frying range according to claim 11, wherein a pivot pin projects inwardly from a sidewall of said lid and said lever passes inside said lid and engages on said pivot pin.

13. A frying range according to claim 11, wherein said lever is cranked so that a part of said lever intermediate its ends is offset rearwardly from a straight line joining its pivot mountings.

14. A frying range of the kind used by fish friers comprising a pan, a lid for closing said pan, and articulation means mounting said lid for movement between a closed position overlying said pan and a spaced fully open position, said articulation means including a pair of channel members fixed relatively to said pan and disposed one on each side of said lid, and a pair of studs projecting one from each side of said lid and engaging respectively in said channel members, whereby said articulation means constrains a rear part of said lid to move rearwardly along a substantially horizontal path and a front part of said lid to move along an arcuate path to produce a compound translational and tilting motion of said lid between said closed and said fully open positions.

15. A frying range of the kind used by fish friers comprising a pan, a lid for closing said pan, and articulation means mounting said lid for movement between a closed position on said pan and a spaced fully open position, said articulation means including a pair of cranked levers disposed one on each side of the lid, each of said levers being pivoted at one end on a pivot fixed relatively to said pan and pivoted at its other end to said lid, whereby said articulation means constrains a rear part of said lid to move rearwardly along a substantially horizontal path and a front part of said lid to move along an arcuate path to produce a compound translational and tilting motion of said lid between said closed and said fully open positions.

16. A frying range according to claim 15, wherein a pair of pivot pins project inwardly one from each of the sidewalls of said lid and said levers pass inside said lid and engage respectively one on each side of said pivot pins.

17. A frying range according to claim 16, wherein each of said links is cranked so that a part of each link intermediate its ends is offset rearwardly from a straight line joining its pivot mountings.

18. A frying range of the kind used by fish friers comprising a pan, a lid for closing said pan, and articulation means mounting said lid for movement between a closed position overlying said pan and a spaced fully open position, said articulation means including a pair of channel members fixed relatively to said pan and disposed one of each side of said lid, a pair of studs projecting one from each side of said lid and engaging respectively in said channel members and a pair of levers disposed one on each side of said lid, each of said levers being pivoted at one end on a pivot fixed relatively to said pan and pivoted at its other end to said lid, whereby said articulation means constrains a rear part of said lid to move rearwardly along a substantially horizontal path and a front part of said lid to move along an arcuate path to produce a compound translational and tilting motion of said lid between said closed and said fully open positions.

* * * * *